United States Patent
Demo et al.

(10) Patent No.: US 9,760,858 B2
(45) Date of Patent: *Sep. 12, 2017

(54) RESOURCE RECONCILIATION BASED ON EXTERNAL FACTORS

(71) Applicant: International Business Machines Corporation, Armonk, NY (US)

(72) Inventors: Leonardo F. Demo, Sao Paulo (BR); Mariana R. Franco, Sao Paulo (BR); Denilson Nastacio, Durham, NC (US); Fabio Negrello, Sao Paulo (BR); Cassandro J. D. P. Pereira, Sao Paulo (BR); Maristela Salvatore, Sao Paulo (BR); Paulo H. O. Sousa Leal, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/334,409

(22) Filed: Oct. 26, 2016

(65) Prior Publication Data

US 2017/0046655 A1 Feb. 16, 2017

Related U.S. Application Data

(63) Continuation of application No. 14/474,568, filed on Sep. 2, 2014, now Pat. No. 9,501,489, which is a (Continued)

(51) Int. Cl.
G06F 17/30 (2006.01)
G06Q 10/08 (2012.01)

(52) U.S. Cl.
CPC ....... *G06Q 10/087* (2013.01); *G06F 17/3056* (2013.01); *G06F 17/30091* (2013.01); (Continued)

(58) Field of Classification Search
CPC .................................................. G06F 17/30091
See application file for complete search history.

(56) References Cited

U.S. PATENT DOCUMENTS 7,840,588 B2 11/2010 Bell et al.
7,984,067 B2 7/2011 Henderson
(Continued)

OTHER PUBLICATIONS

Dong, et al.; "Reference Reconciliation in Complex Information Spaces"; SIGMOD 2005; Jun. 14-16, 2005; Baltimore MD; pp. 85-96; Copyright 2005.

(Continued)

*Primary Examiner* — Mohammad S Rostrami
(74) *Attorney, Agent, or Firm* — Edward J. Wixted, III

(57) ABSTRACT

A method that includes a first record that relates to a first subject entity is received and a second record that relates to a second subject entity is received, where it is unknown whether the first subject entity is the same as the second subject entity. A comparison of a first external/non-key attribute value for the first subject entity to a second external/non-key attribute value for the second subject entity is performed. A probability value is calculated, at least in part, on a first external/non-key attribute value for the first subject entity to a second external/non-key attribute value for the second subject entity.

20 Claims, 4 Drawing Sheets

Related U.S. Application Data continuation of application No. 14/039,631, filed on Sep. 27, 2013.

(52) U.S. Cl.
CPC .. *G06F 17/30283* (2013.01); *G06F 17/30371* (2013.01); *G06F 17/30557* (2013.01)

(56) References Cited

U.S. PATENT DOCUMENTS

| | | |
|---|---|---|
| 8,244,689 B2 | 8/2012 | Betz et al. |
| 2009/0063562 A1 | 3/2009 | Dinger et al. |
| 2010/0088280 A1 | 4/2010 | Satoyama et al. |
| 2010/0153187 A1 | 6/2010 | Ghani et al. |
| 2010/0161577 A1 | 6/2010 | Morozov |
| 2010/0293205 A1 | 11/2010 | Baker et al. |
| 2011/0153787 A1 | 6/2011 | Baker et al. |
| 2011/0246238 A1 | 10/2011 | Vdovjak et al. |
| 2011/0282687 A1 | 11/2011 | Koll |
| 2011/0282728 A1 | 11/2011 | Bingham et al. |
| 2011/0296133 A1* | 12/2011 | Flynn .................. G06F 11/1048 711/171 |
| 2011/0307440 A1 | 12/2011 | Panchenko |
| 2012/0095819 A1 | 4/2012 | Li |
| 2012/0096163 A1 | 4/2012 | Tai et al. |
| 2012/0203576 A1 | 8/2012 | Bucur et al. |
| 2013/0346425 A1 | 12/2013 | Bruestle |
| 2014/0156637 A1 | 6/2014 | Stout et al. |
| 2015/0095357 A1 | 4/2015 | Demo et al. |
| 2015/0095358 A1 | 4/2015 | Demo et al. |

OTHER PUBLICATIONS

Demo et al., "Resource Reconciliation Based on External Factors", U.S. Appl. No. 14/039,631, filed Sep. 27, 2013.

* cited by examiner

RESOURCE RECONCILIATION BASED ON EXTERNAL FACTORS

FIELD OF THE INVENTION

The present invention relates generally to the field of non-human resource management, and more particularly to inventory control for computer-related equipment.

BACKGROUND OF THE INVENTION

As used herein, the words "resource" and/or "entity" will be used to mean non-human, physical assets that can be controlled by a "managing-entity." A simple, non-limiting example is a company that manages its desktop computers. In this example, the managing-entity is the company (acting through its employees, contractors, agents and/or software), and the "entities" (or "resources") are the desktop computers. Resources are sometimes referred to as uniquely defined entity by an attribute or a combined group of attributes. It is understood that internal components (sometimes bearing separate identities of their own) may be added and/or removed from these desktop computers during the life of each respective desktop computer. It is known that machine data sets regarding an entity are often created during the lifetime of the entity, and these data sets are herein referred to as "records." It is further known that multiple, different records may exist with respect to a single entity. It is further known that sometimes there are attempts to understand which records relate to which entities, and this process of matching records to entities and/or to each other will herein be referred to as "reconciliation."

Inventory and management tools are some of the tools that automatically discover the physical and application infrastructure in an enterprise. These tools collect information about specific attributes that relate to a specific domain. Small companies to large corporations possess a heterogeneous computer enterprise that is constantly being updated and reconfigured. Enterprise computer systems are complex enterprises that serve mission critical business functions. The set of hardware and software items that constitute a computer enterprise are an interdependent integrated platform which serves a multi-functioned, multi-processed, and multi-structured organization.

The Information Technology (IT) staff is responsible for the inventory configuration and management of IT equipment. Without proper software to help maintain a database the enterprise can quickly become outdated and unmanageable. Without knowing the state of the hardware and the software policy decisions can be costly. Inventory configuration management can answer questions like: (i) what equipment and resources are currently owned; (ii) how can this inventory information be gathered and updated automatically, without direct hands-on examination of each device, and without hand-documenting with a pen and notepad; (iii) what needs upgrade or repair; (iv) what can the IT staff consolidate to reduce complexity or reduce energy use; or (v) would resources be better reused somewhere else?

SUMMARY

Aspects of an embodiment of the present invention disclose a method, computer program product, and computing system. A first record that relates to a first subject entity is received. A second record that relates to a second subject entity where it is unknown whether the first subject entity is the same as the second subject entity is received. A comparison of a first external/non-key attribute value for the first subject entity to a second external/non-key attribute value for the second subject entity is performed. A probability value corresponding to the probability that the first subject entity and the second subject entity are the same based, at least in part, upon the comparison of the first external/non-key attribute value to the second external/non-key attribute value is determined. The first external/non-key attribute value is one of the following types: (i) a value for an external attribute which is not included in the first record, or (ii) a value for a non-key attribute which is included in the first record, but which is not a value for a key attribute of the first record. The second external/non-key attribute value is one of the following types: (i) a value for an external attribute which is not included in the second record, or (ii) a value for a non-key attribute which is included in the second record, but which is not a value for a key attribute of the second record.

DETAILED DESCRIPTION

Figure 1:
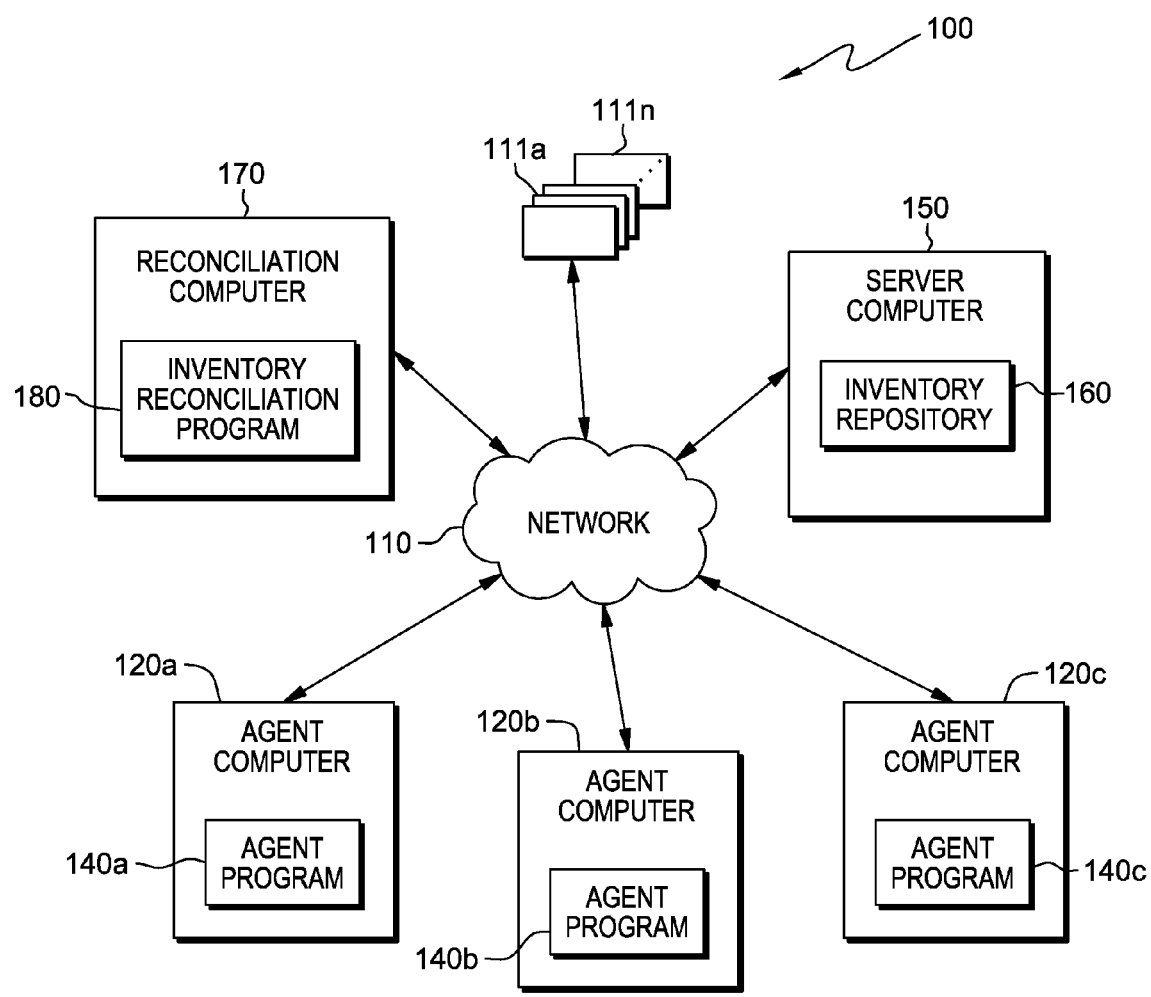
FIG. 1 is a diagram of a distributed data processing environment, in accordance with one embodiment of the present invention.

Data reconciliation consists in constructing a reconciled view of the same entity, or resource, based on attributes collected from different sources. An entity can be a Configuration Item, such as defined by the IT Infrastructure Library (ITIL), or any physical object that needs to be managed for a specific purpose. An entity can be identified by a set of unique attributes, the same way natural composite keys may be used to identify records in relational databases. A natural composite key has the advantage over a unique numeric ID in that a composite key facilitates the identification of the same entity across different systems. Natural keys are based on real world observation, not on made up numeric identifiers. For example, a computer system may be uniquely identified by any of the following attributes: attribute System Board UUID (universal unique identifier), attribute MAC address, or a composite natural key composed by Manufacturer, Model and Serial Number.

Inventory and management tools are some of the tools that automatically discover the physical and application infrastructure in an enterprise. These tools collect information about specific attributes that are related to a specific domain. For example, considering a computer, while one tool may be interested in attributes related to the network topology, like IP (internet protocol) address, subnet and Ethernet address, other tool may be interested in software related information, like Operating System and Installed Software. The attributes discovered by each one of the different tools may overlap. For example, both tools may discover the IP address of the computer. The attributes that overlap can then be used by a reporting tool to reconcile all the information and build, for example, a reconciled report of all the data collected by the different tools. Due to security, operational or environment restrictions, not all the attributes of the considered entities that are necessary to reconcile the records may be available. In some embodiments of the present disclosure, non-key and external attributes play an important role helping to match or dissociate the existing records to build a reconciled view of the data.

Some embodiments of the present disclosure a method for data reconciliation based on non-key attributes and external factors. Normally, two or more records from different sources can be reconciled only if exists a match between attributes of a composite key. Some methods of the present disclosure use non-key and external information to detect when different records apply to different subject entities (this is sometimes herein called "splitting-style reconciliation). In some embodiments, non-key attributes are attributes that do not belong to a triple or a unique attribute which define uniquely a resource. For example, computer systems have attributes like fan speed, memory usage, and central processing unit that are non-key attributes and can not uniquely define a computer.

Some embodiments of the present disclosure provide: (i) a probabilistic approach for determining the similarity between the records used to construct a reconciled view an entity; (ii) a method for gradually splitting a reconciled resource after a record from this resource is removed, based on information provided by "external attributes" (sometimes also called "external factors") and/or "non-key attributes" (these terms are more fully discussed, below, external attributes and/or non-key attributes are collective herein referred to as "external/non-key attributes);" (iii) use of non-key and external information to detect when different records are no longer the same; (iv) a probabilistic approach for determining the similarity between the records used to construct a reconciled view an entity; and/or (v) a method for gradually splitting a reconciled resource after a record from this resource is removed, based on information provided by external/non-key attributes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. The following Figures provide an illustration of one embodiment. The embodiment, taken in part or in whole, does not imply any limitations with regard to the environments in which different embodiments may be implemented.

FIG. 1 is a diagram of a distributed data processing environment 100 in accordance with one embodiment of the present invention. Distributed data processing environment 100 includes: entities (or resources 111a to n); agent computer 120a; agent computer 120b; agent computer 120c; server computer 150; reconciliation computer 170; and network 110. Entities 111a to n are the entities that are subject to inventory management, record-keeping and record reconciliation. Agent computers 120a to 120c collect information about the entities, and generate records, relating to the various entities, based on the collected information. Server computer 150 receives the records from the agent computers and stores them for purposes such as inventory management and records reconciliation. Reconciliation computer 170 reconciles the records in server computer 150 using an embodiment of software, and examples of methods, according to the present disclosure. Large portions of this disclosure, set forth below, will deal with what reconciliation computer 170 (and its inventory reconciliation program 180) does.

Figure 4:
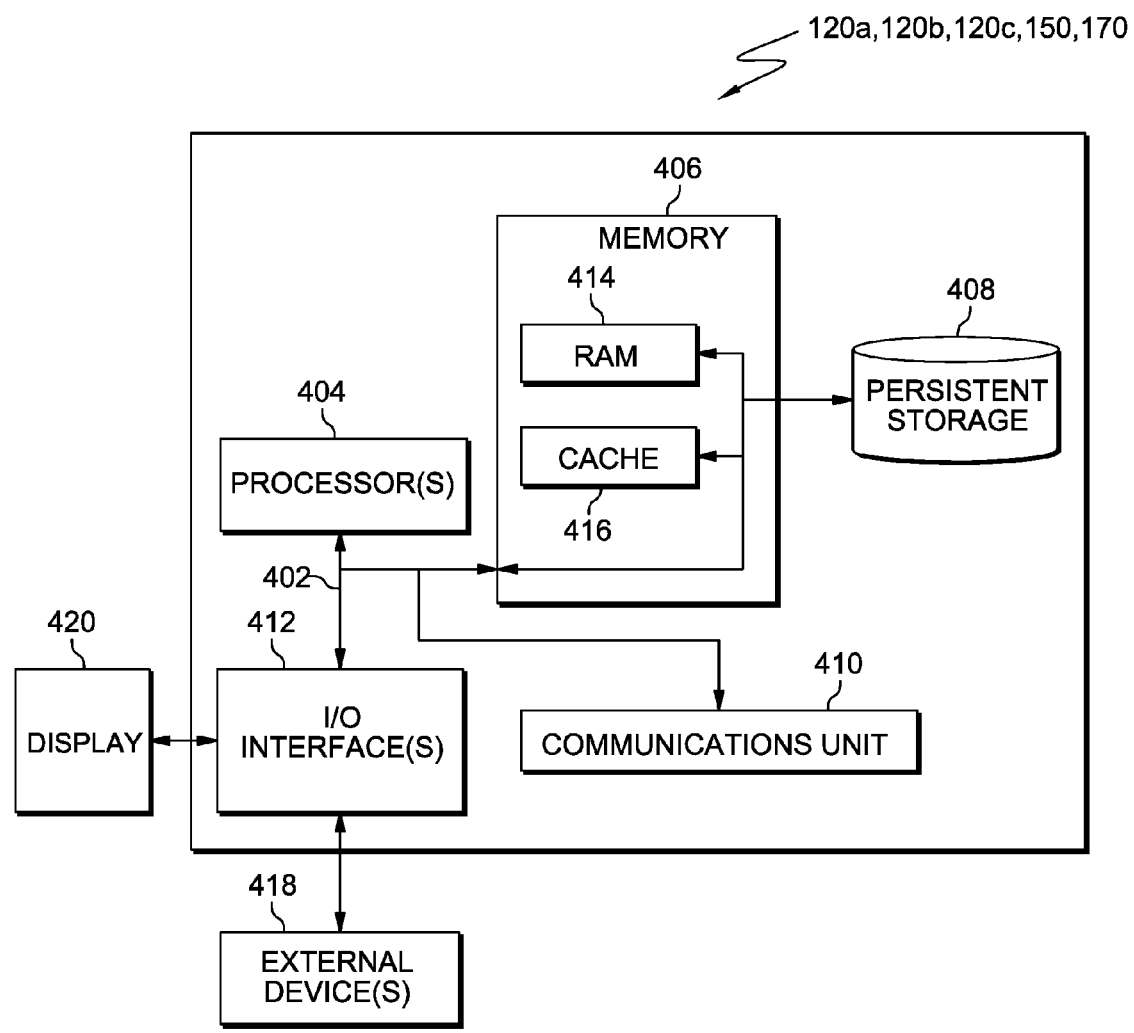
FIG. 4 depicts a block diagram of components of agent computers, reconciliation computer, and server computer, in accordance with one embodiment of the present invention.

Agent computer 120a, agent computer 120b, agent computer 120c, server computer 150, and reconciliation computer 170 may each include components as depicted in further detail with respect to FIG. 4. Network 110 may be a local area network (LAN), a wide area network (WAN) such as the Internet, any combination thereof, or any combination of connections and protocols that will support communications among agent computer 120a, agent computer 120b, agent computer 120c, server computer 150, and reconciliation computer 170, in accordance with embodiments of the present invention. Network 110 may include wired, wireless, or fiber optic connections. Distributed data processing environment 100 may include additional servers, or other devices not shown.

Agent computer 120a, agent computer 120b, agent computer 120c, server computer 150, and reconciliation computer 170 may each represent a server computing system utilizing multiple computers as a server system, such as in a cloud computing environment. In another embodiment, agent computer 120a, agent computer 120b, agent computer 120c, server computer 150, and reconciliation computer 170 may each be a laptop computer, tablet computer, netbook computer, personal computer (PC), a desktop computer, a personal digital assistant (PDA), a smart phone, or any programmable electronic device capable of receiving and sending data.

Server computer 150 may be a management server, a web server, or any other electronic device or computing system capable of receiving and sending data, and capable of communicating with devices, such as reconciliation computer 170, via network 110. In other embodiments, server computer 150 may represent a server computing system utilizing multiple computers as a server system, such as in a cloud computing environment.

Reconciliation computer 170 includes, but is not limited to: (i) a client computer; (ii) a user computer; (iii) a server computer; or (iv) any of the other devices described above as computing devices.

Figure 2:
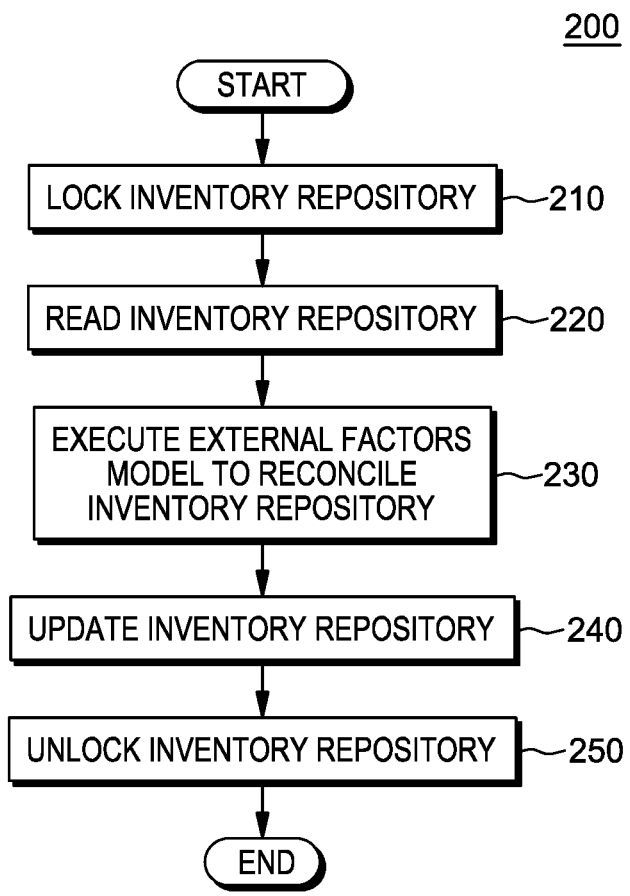
FIG. 2 is a flowchart depicting operational steps of an inventory reconciliation program for record reconciling and updating an inventory repository in accordance with one embodiment of the present invention.

As shown in FIGS. 1 and 2, agent computer 120a, agent computer 120b, agent computer 120c respectively include: agent program 140a (including collected record 310), agent program 140b (including collected record 320), and agent program 140c (including collected record 330). Inventory reconciliation program 180 utilizes the information extracted by agent program 140a, agent program 140b, and agent program 140c, and stored in inventory repository 160. Some embodiments may contain zero agent computers. Agent programs 140a, 140b, and 140c include, but are not limited to: (i) software agents; (ii) hardware agents; (iii) general public searching for inventory repository information; and (iv) programs that emulate human behavior, such as artificial intelligence automata, with sufficient intelligence to act as an agent program searching for inventory repository information. One embodiment of an agent computer allows an agent program to communicate with other computers on network 110.

Hereafter, the programs that directly collect entity state will be referred to as agents and a set of attributes, which includes a partial view, from a resource will be referred to as a record. Agents are programs that run over a network and can discover record changes. Some agents use simple network management protocol (SNMP) to retrieve record information.

Agents can independently update the repository and can have different views about the record information. An agent may only be interested in specific record information, for example: (i) hardware agents only work with hardware inventory, such as: hard disks, ram memory, etc. and (ii) software agents only work with software inventory, such as: operating systems, installed software, etc.

In one embodiment, server computer 150 contains inventory repository 160. Inventory repository 160 holds information that represents an inventory of a heterogeneous computer enterprise system controlled by reconciliation computer 170. A record (also referred to as a "row" or a "tuple"), in a relational database, represents a single, implicitly structured data item in a table. For example, information on a disk drive can be stored in a record, in this instance record 2: "REC2={MAC1}, {Temp=27 C, 8500.00 RPM}", which provides: a Media Access Control address, temperature of the disk, and disk speed. In this example, MAC1 can be a key attribute.

Some terms will now be defined. A "key attribute" is an attribute of a resource used primarily for entity identification purposes. A "composite key" is a combination of key attribute values in a record that is helpful for entity identification purposes (a composite key is generally more helpful for identification purposes than is a single key attribute value). A "unique composite key" (or "unique key" in the case of a single attribute value version) is a composite key that is sufficient to uniquely identify an entity. "Internal attributes" (also sometimes herein referred to as "regular attributes") are attributes whose values are normally present in a given type of record. "External attributes" are different from internal attributes in that they are not normally present in a given type of record because they are: (i) obtained from other resources that may not be directly related to the observed resource; or (ii) not in the set of attributes that are normally observed in the subject entities. External attributes can be obtained in real time, while internal attributes have internal attribute values that are part of a record, meaning that the internal attribute value may no longer be current after the record has been created and stored. In the sense, internal attributes are just a snapshot from a resource state. "Non-key attributes" (also called "fact attributes") are present in records for primary purposes other than identification of an entity. Often, a non-key entity will reflect an operating parameter of an entity. For example, disk speed and temperature are non-key attributes typically present in a record where the subject entity is a disk drive device.

In one embodiment, inventory repository 160 is a data file that may be written to and read by inventory reconciliation program 180. An example of inventory repository 160 is a database management system (DBMS). In some embodiments, inventory repository 160 may be located on reconciliation computer 170, another server, or other computing device (shown or not shown), provided that inventory repository 160 is accessible to inventory reconciliation program 180.

Attributes whose value change frequently (referred to as "dynamic attributes") are less reliable than attributes whose value change in a low frequency or do not change at all during the life period of an entity. In the extreme case, the value of an attribute should not be used to calculate the similarity between the two records when this attribute value changes too frequently or in an unpredictable way. For example, the number of CPUs is an attribute that is considered stable during the life period of a computer, although it may change sometimes. However, the CPU state (up or down) may change very frequently (thousands of times) during the life period of a computer.

With an increasing interval between the time of observations of two distinct records, there is decreasing reliability of those dynamic attributes of these records. Considering the number of CPUs, this value may still be reliable for a period of days, while the system temperature should not be reliable in a matter of minutes, because it may change very frequently. Therefore, the number of CPUs is more reliable than the temperature when determining if two computers are no longer the same.

Let the volatility of an attribute s, when comparing two records K and P collected at times, $t_k$ and $t_p$, be represented as vol(s). For simplification, consider that s is reliable if the time interval $|t_k-t_p|$ is smaller than a predefined maximum time interval $\theta_s$:

vol(s)=1 if $|t_k-t_p|<\theta_s$, vol(s)=0 otherwise.

The matching probability of the two values t and p of the attribute s can then be calculated as: prob(ti,pi)=(1−(|ti−pi|/max(ti,pi)·$\Delta$max)·vol(s)). In this embodiment, this approach uses the time interval just to accept or refuse a specific attribute in the calculus of the matching probability between two records. However, vol(s) could be further refined to consider the length of the time interval as an additional factor to lower the matching probability of the values that are inside the threshold $\theta_s$, in the same manner as $\Delta_{max}$ (as will be explained, below).

In one embodiment, reconciliation computer 170 contains inventory reconciliation program 180. One embodiment of reconciliation computer 170 allows inventory reconciliation program 180 to communicate with other computers on network 110. Inventory reconciliation program 180 contains the instructions to correct inconsistent and outdated records. More specifically, in one embodiment, after a record is removed from a resource inventory reconciliation program 180 splits a reconciled resource. In another embodiment, inventory reconciliation program 180 can combine records when appropriate. In still another embodiment, inventory reconciliation program 180 provides a probabilistic approach for determining the similarity between the records used to construct a reconciled resource. Inventory reconciliation program 180 communicates with inventory repository 160.

FIG. 2 is a flowchart 200 depicting operational steps of an inventory reconciliation program 180 reconciling records and updating an inventory repository in accordance with one embodiment of the present invention.

Starting at step 210, inventory reconciliation program 180 locks inventory repository 160. More specifically, in one embodiment, because a variety of agents and entities (such as users seeking information) can access the records at anytime, the repository must be isolated to provide data integrity and achieve reliable application performance and behavior. The method to achieve data integrity, as someone in the arts would recognize, would include, but not limited to: (i) transaction locking; (ii) session locking—pessimistic transaction locking and optimistic transaction locking; and (iii) course grained locking.

In step 220, inventory reconciliation program 180 reads inventory repository 160. Inventory reconciliation program 180 communicates with server computer 150 to request specific inventory record data. The method to communicate (sometimes referred to as "data handshaking") may include, but not limited to, communication over a network: such as (i) emailing requests and responses, using possibly simple mail transfer protocol (SMTP); (ii) off-the-shelf or custom-developed applications that allow data transferring; (iii) extensible markup language (XML), or variations of such, one being blocks extensible exchange protocol or "beep;" (iv) transmission control protocol/internet protocol TCP/IP or its derivatives; (v) process communication, such as messaging; and (vi) using computer browsers for the inquiries and responses. For instance, using an off-the-shelf or custom-developed application, a transmission control protocol/internet protocol (TCP/IP) can be established to pass the data to and from inventory repository 160.

The reading of the repository can be a request for: (i) one record at a time; (ii) multiple records that are only related to a pertinent query; (iii) the entire repository; and/or (iv) or any combination of the foregoing.

In step 230, inventory reconciliation program 180 executes the external factors model to reconcile inventory repository 160 records. Inventory reconciliation program 180 performs mathematical calculations to reconcile records read in step 220. The external factors model will now be described in detail for one embodiment of the present invention.

A record R is defined as the union of composite keys K and a tuple of non-key attributes A:

R=K U A

R={$K_1, K_2, \ldots, K_n$} U {$a_1, a_2, \ldots a_n$}

A composite key $K_i$ is defined as a tuple {$k_{i1}, k_{i2}, \ldots k_{im}$}, where m is $|K_i|$. Note that a simple key can be understood as a composite key where m=1.

The representation of an unknown value is "?". Two values k and p are defined as compatible if k=p or k is ? or p is ?. The compatibility function Compatible(k, p) is defined as true if k is compatible top. Two tuples of values K={k1, k2, ... km} and P={p1, p2, ..., pm} are compatible if for all 1<=i<=m, Compatible($k_i$, $p_i$) is true. There was a partial matching between K and P if Compatible(K, P) is true and, at least for one pair ($k_i$, $p_i$), $k_i$ and $p_i$ are not null. A complete matching between K and P takes place when K=P.

For example, consider K={Model1, Man1, ?} and P={Model1, ?, SN1}. Compatible(K, P) is true because there is no contradictory value in the same position of the two sets. If P={Model2, ?, SN1}, then Compatible(K, P) is false, because Model1≠Model2.

Calculate matching distance between two tuples K and P, represented by MDistance(K, P) is defined as ∞ (infinity) if the two tuples are not compatible or the two tuples refer to different composite keys. Otherwise, the matching distance is defined as the number of pairs $k_i$, $p_i$ such that Compatible ($k_i$, $p_i$) is true and $k_i$=? or $p_i$=?.

An example of calculating MDistance is as follows:
MDistance({Model1, Man1, SN1},{Model1, ?, SN1})=1
MDistance({Model1, ?, SN1},{Model1, ?, SN1})=1
MDistance({Model1, Man1, ?},{Model1, ?, SN1})=2
MDistance({?, ?, ?},{?, ?, ?})=3
MDistance({?, ?},{?, ?})=2

The MDistance function, alone, can be an auxiliary concept that helps to determine the similarity between two records. However, considering the whole record, with all the keys and attributes, the distances must take into account the number of elements in each key. For example, consider the following records of an entity:
REC1={a, b},{c, d, ?}
REC2={?, b},{c, ?, ?}
REC3={?, ?},{c, d, ?}

Considering the MDistance between two records as just the sum of the individual MDistances values of each key, this embodiment of the present invention would have:
MDistance(REC1, REC2)=3
MDistance(REC1, REC3)=3
MDistance(REC2, REC3)=4

Note that MDistance(REC1, REC2)=MDistance(REC1, REC3)=3. However, intuitively, the probability of REC1 and REC2 refer to the same entity is higher than the probability of REC1 and REC3, because this embodiment of the present invention has at least a partial match in the first key of REC2 and no match in REC3. By definition, two records refer to the same entity if they have at least one key in common. Therefore, the higher the probability that there exists a complete match for one key, the higher the probability two records refer to the same entity.

Calculate the relative matching distance between two tuples K and P, represented by RMDistance(K, P), is defined as MDistance(K, P)/|K|. Considering that the values for attribute values is sparsely distributed, this function can be used as a heuristic metric for computing the probability that two records refer, or do not refer, to the same entity.

An example of calculating RMDistance is as follows:
RMDistance(REC1, REC2)=1/2+2/3=1.17, while RMDistance(REC1, REC3)=2/2+1/3=1.34. Therefore, RMDistance (REC1, REC2)<RMDistance (REC1, REC3).

The actual probability that two tuples are equal has to take into consideration the probabilistic distribution of the data. For a specific attribute t with value v, the probability that another record will have the value v for t, represented as prob(t,v) can be calculated as Count(t,v)/Count(t,any), where Count(t,v) represents the total number of records that have the value v for t, and Count(t,any) represents the total number of records. From statistics, the probability that a tuple $\{t_1, t_2, \ldots t_n\}$ has the values $\{v_1, v_2, \ldots, v_n\}$ is calculated as the product of the individual probabilities: product(prob($t_i$, v)).

The probability that two key tuples K={$k_1, k_2, \ldots, k_m$} and P={$p_1, p_2, \ldots, p_m$} are equal, represented as MatchingProb(K,P), is calculated as product(prob($t_i$, v)) for all pair($k_i$,$p_i$) where $k_i$ is not null or $p_i$ is not null, where v is the value, which is not null, in the pair($k_i$,$p_i$). If $k_i$=$p_i$ the pair is not considered in the calculus as they are known values. For consequence, if K=P, then MatchingProb(K,P)=1. Note that if $k_i$≠$p_i$ for any i, then MatchingProb(K,P)=0. If $k_i$ is null and $p_i$ is also null, prob($t_i$) is calculated as 1 divided by the number of distinct values for $t_i$ in the repository: 1/Count (Distinct(t)).

The probability that two records refer to the same entity, represented by MatchingProb(R,S) is given by product (MatchingProb($K_{ri}$,$K_{si}$)).

When taking into consideration external attributes, the simple comparison for equality between two values may not be precise enough. For example, external attributes that represent measures like temperature, fan speed and voltage may have small variations that are expected. There are two possible approaches for variance.

Approach 1: consider that two values are equal if their relative, or absolute, difference is smaller than a predefined threshold. For example, for temperature this embodiment of the present invention can consider a relative variation $\Delta_{max}$ of +/-5%. The calculus of prob($t_i$,$p_i$) is defined as 1 if $t_i$=$p_i$ or |$t_i$-$p_i$|<max($t_i$,$p_i$)*$\Delta_{max}$, and 0 otherwise.

Approach 2: take into account the relative difference in the calculus of the matching probability. The calculus of prob($t_i$,$p_i$) is 1-|$t_i$-$p_i$|/max($t_i$,$p_i$)*$\Delta_{max}$. For example, for two values of temperature 36.5 and 37.8, prob(36.5,37.8)=1-(37.8-36.5)/0.05*37.8=1-1.3/1.89=1-0.69=31%. Note that the smaller the difference, the greater the matching probability.

The probability that two records refer to the same entity can be extended to include non-key attributes as follows: MatchingProb(R,S)=product(MatchingProb($K_{ri}$,$K_{si}$))·product(prob($A_{ri}$,$A_{si}$))), where Ari is the i-th non-key attribute of R. Note that the non-key attributes will always include a degree of uncertainty in the match of records. If the difference of the values is greater than the allowed variance $\Delta_r$, the values will cause a matching probability of 0%.

In the following example for one embodiment demonstrates how a previously Reconciled Resource is split after a record is removed (REC3 in this case). Suppose there are three agents:
Agent 1 collects just Host Name
Agent 2 collects Operating System (only Windows Systems)
Agent 3 collects Host Name and Operating System
All agents collect non-identifying information Label and Display Name.
Agent 3 is therefore the agent that is responsible for providing the information necessary to reconcile the records provided by the other agents. If a record provided by Agent 3 is removed, or for some reason invalidated, this embodiment of the present invention needs the non-identifying attributes to know if the records provided by Agents 1 and 2 are still referring to the same entity. Tuples for each record are defined by the following:
Key Attributes: {Host Name, Operating System}
External Factors: {Label, Display Name}
Maximum variation for external factors ($\Delta_{max}$);
with constraints:
Label: 0% (no variation allowed)
Display Name: 0% (no variation allowed)
Maximum time lapse ($\theta_s$):
Label: 1 month
Display Name: 1 month (these values will not change in a period of 1 month);
records are:
REC1={hostA, ? }{LabelA, DisplayA} created on 07/05/2012

REC2={? , Windows XP}{LabelA, DisplayA} created on 07/05/2012

REC3={hostA, Windows XP}{LabelA, DisplayA} created on 08/05/2012

REC4={hostB, ? }{LabelB, DisplayB} created on 10/05/2012

REC5={hostB, Linux}{LabelB, DisplayB} created on 15/05/2012

The calculus of the matching probability of each record to all records registered before it is listed below. Only the records that have matching probability greater than zero are listed:

Reconciliation for REC1
No reconciliation performed.
Reconciliation for REC2
No reconciliation performed.
Reconciliation for REC3
REC1: extProb=100.0%
REC2: extProb=100.0%
Reconciliation for REC4
No reconciliation performed.
Reconciliation for REC5
REC4: extProb=100.0%

The reconciliation for the records above will produce two Reconciled Resources: one containing REC1, REC2 and REC3, and another containing REC4 and REC5:

RECONCILED RESOURCE 1={hostA, Windows XP}{LabelA, DisplayA}

RECONCILED RESOURCE 2={hostB, Linux}{LabelB, DisplayB}

After removal of REC3, RECONCILED RESOURCE 1 will be composed by REC1 and REC2, both with 100% certainty.

Suppose now that REC2 is updated:

REC2={? , Windows XP}{LabelC, DisplayC} modified on 20/05/2012

New MatchingProb of REC2 when compared to RECONCILED RESOURCE 1 is 0% because LabelC is different from LabelA and DisplayC is different from DisplayA.

By recalculating MatchingProb this embodiment of the present invention knows that REC2 does not belong to the RECONCILED RESOURCE 1 any more, and should be disassociated from it. Note that the update was performed within the maximum time lapse defined for Label and Display, so these values can be used to calculate the discrepancy between the Record and the Reconciled Resource.

RECONCILED RESOURCE 1={hostA, ? }{LabelA, DisplayA}

RECONCILED RESOURCE 2={hostB, Linux}{LabelB, DisplayB}

RECONCILED RESOURCE 3={? , Windows XP}{LabelB, DisplayB}

Note for this example non-measurable attributes are used. The only possible comparison is equality. However, external factors such as Temperature, Number of Fans, Voltage, and Electricity could also be used. In this case, there would be a gradual disassociation of the split Records from the Reconciled Resource.

The following example, for one embodiment, is a demonstration of how to perform reconciliation, instead of split, by using information provided by incomplete composite keys and external attributes.

Key Attributes: {Model, Manufacturer, Serial Number}
External Factors: {Temperature, Number of Fans, Voltage, Electricity}

Maximum variation for external factors ($\Delta$max): (i) Temperature: 5%; (ii) Number of Fans: 0% (no variation allowed); (iii) Voltage: 2%; and (iv) Electricity: 20%.

REC1={? , Lenovo, LG3F3K1} {38.5° C., 3, 110V, 3.2 A}
REC2={? , HP, XY2Z3P2} {26.0° C., 3, 220V, ?}
REC3={T60P, Lenovo, FG3F3K1} {35.5° C., 3, 110V, 3.2 A}
REC4={T60P, Lenovo, ? } {37.5° C., 3, 110V, 3.2 A}
REC5={? , HP, XY2Z3P2} {26.0° C., 3, 110V, ?}
REC6={T60P, ? , LG3F3K1} {38.5° C., 3, 110V, 3.1 A}

An example of the calculus for the matching probability between REC6 and REC1 is as follows.

Probability of Model be T60P=3/6=50%
Probability of Manufacturer be Lenovo=3/6=50%
Probability of Serial Number be LG3F3K1=100% (they are equal, thus not considered in the probability calculus)
Key probability=(0.5*0.5)=25%
Temperature: $\Delta$=38.5−38.5=0
Accuracy: 1−0/38.5=100%
Number of Fans: $\Delta$=3−3=0
Accuracy: 1−0/3=100%
Voltage: $\Delta$=110−110=0
Accuracy: 1−0/110=100%
Electricity: $\Delta$=3.2−3.1=0.1
Accuracy: 1−0.1/0.2*3.2=1−0.1/0.64=84.4%
Total Match Probability=Key Probability*External Probability=0.25*0.844=21.1%

The calculus of the matching probability of each record to all records registered before it is listed below. Only the records that have matching probability greater than zero are listed, as follows:

Reconciliation for REC1
No reconciliation performed.
Reconciliation for REC2
No reconciliation performed.
Reconciliation for REC3
REC1: extProb=48.1%, keyProb=50.0%, overall=24.0%
Reconciliation for REC4
No reconciliation performed.
Reconciliation for REC5
REC2: extProb=54.5%, keyProb=33.3%, overall=18.2%
Reconciliation for REC6
REC1: extProb=84.4%, keyProb=25.0%, overall=21.1%
REC3: extProb=40.5%, keyProb=50.0%, overall=20.3%

The following example, for one embodiment, is a demonstration of detecting when two different entities are no longer the same.

An important aspect of data reconciliation, besides matching different entities, is the ability of detecting when two different entities are no longer the same. For example, a computer can be identified by IP address, but can also be identified by the system board universal unique identifiers (UUID), which is unique. Also, the primary MAC address can be used to identify a computer. An agent may collect a record REC1 containing attributes IP address and system board UUID, while another agent may collect a record REC2 containing IP address and primary MAC address. Finally, a third agent may collect a record REC3 with primary MAC address and system board UUID. In this case, a reconciliation tool would have no difficulty in inferring the three entities refer to the same computer as there are overlapping key attributes in the records collected by the different agents.

REC1={IP1},{SB1}
REC2={IP1},{MAC1}
REC3={SB1},{MAC1}
RECONCILED RESOURCE=ENTITY 1={IP1},{SB1}, {MAC1}

Suppose that another agent collects a new record REC4 containing the same values for system board UUID as in REC3 but a different value for a primary MAC address. As it is inconsistence to have a conflicting set of keys in the same entity; thus, it can be inferred that there is a new entity. In this case, the network card identified by MAC1 may have been moved to another computer and replaced by a new network card MAC2. Additionally, albeit with smaller probability, the mother board SB1 may have been relocated to another computer.

REC1={IP1},{SB1}
REC2={IP1},{MAC1}
REC3={SB1},{MAC1}
REC4={SB1},{MAC2}
RECONCILED RESOURCE 1={E1, E2}, where
E1={IP1},{SB1},{MAC2}
E2={MAC1}
RECONCILED RESOURCE 2={E1', E2'}, where
E1'={IP1},{MAC1}
E2'={SB1},{MAC2}

Suppose now that REC4 has the same value as the primary MAC address from REC2, but has value {IP2} for IP address. The information in REC4 regarding that the network card with MAC address MAC1 is now associated with {IP2} contradicts the information that was provided by the previous records REC1, REC2 and REC3. Consequently, by inference, the original entity was reconfigured, and the unified view of it has to be reconstructed. In this situation, there are two possible outcomes:

REC1={IP1},{SB1}
REC2={IP1},{MAC1}
REC3={SB1},{MAC1}
REC4={IP2},{MAC1}
RECONCILED RESOURCE 1={E1, E2}, where
E1={IP2},{SB1},{MAC1}
E2={IP1}
RECONCILED RESOURCE 2={E1', E2'}, where
E1'={IP2},{MAC1}
E2'={IP1},{SB1}

When there is more than one possible outcome when reconciling data from multiples sources, one embodiment of the present invention is to use extra information aggregated by external or non-key attributes. This information may be obtained in real time, giving a reasonably accurate view an entity, or can be obtained together with the domain specific attributes, during regular data collection. Suppose the agents that collected records REC1, REC2, REC3 and REC4 also collected fan speed and system temperature of the source computers. While this information may not be useful if the temperature and fan speed is the same for all computers, it can be used to infer the real state of the entity if there are discrepancies between the values.

REC1={IP1},{SB1}, {Temp=27 C, 8500.00 RPM}
REC2={IP1},{MAC1}, {Temp=27 C, 8500.00 RPM}
REC3={SB1},{MAC1}, {Temp=27 C, 8500.00 RPM}
REC4={IP2},{MAC1}, {Temp=25 C, 9840.00 RPM}

Taking into account the external information provided in REC4, this embodiment of the present invention can demonstrate with a certain degree of reliability that it is a new computer. In actuality, in this example, the IP address of the computer was just moved to a new computer. Therefore the RECONCILED RESOURCE 2 probably reflects the real state of the entities.

The following example, for one embodiment, is a demonstration of deletion or invalidation of one record to help to determine how the reconciled view must be changed.

External or non-key attributes can be also used after the deletion or invalidation of one record to help to determine how the reconciled view must be changed. For example, consider that one agent is capable of obtaining information about operating systems and had discovered a record REC1 with the key attributes OSName AIX and OS Version 7. While the other agent, collecting only information about the operating system host name, discovered record REC2 with the key attribute HostName aixserver.com, as observed:

REC1={OSName1, OSVersion1}
REC2={HostName1}

A third agent collects REC3 with OSName AIX, OS Version 7 and HostName aixserver.com. This will produce a reconciled view of the tree resources indicating that they represent the same operating system.

REC1={OSName1, OSVersion1}
REC2={HostName1}
REC3={OSName1, OSVersion1}, {HostName1}
RECONCILED RESOURCE 1=ENTITY 1={OSName1, OSVersion1}, {HostName1}

Assume that, for some reason, the record REC3 has been deleted or removed. In this case, there are two possible results: (1) the reconciled view is split into two entities E1 and E2, indicating that the REC1 and REC2 does not represent the same operating system; or (2) the previous unified view E1' is not changed, assuming that the removal of a record does not invalidate previous assumptions.

REC1={OSName1, OSVersion1}
REC2={HostName1}
RECONCILED RESOURCE 1={E1, E2}, where
E1={OSName1, OSVersion1}
E2={HostName1}
RECONCILED RESOURCE 2={E1'}, where
E1'={OSName1, OSVersion1}, {HostName1}

Non-key attributes and external factors can help in this case indicating whether a reconciled view must be changed or not after the removal of one resource. This can be done by comparing the non-key or external attributes of the other resources related to the unified view. In this example, suppose that REC1 and REC2 also collected the KernelVersion. If both the KernelVersion are not the same it is more probable that the two records do not represent the same operating system (RECONCILED RESOURCE 1). Otherwise, if the KernelVersion is the same, there is no information to invalidate the previous assumption (RECONCILED RESOURCE 2).

When at least one key attribute, or set of key attributes, for entities are missing external attributes may also be used to reconcile data. For instance, due to security restrictions, or environment limitations, it may also not be possible for the agents to collect all the attributes of a composite key. In this situation, partial matching is possible of the computer based on the attributes collected. However, depending on the number of computers, and the rate of repetition for the attributes accessible, the data may not be reconcilable properly. External attributes may be used to give an extra degree of reliability in this situation, because external attributes can be used to state that two entities cannot be the same entity. Similarly, external attributes can be used to increase the probability that two records refer to the same entity.

Consider the set of key attributes {Model, Manufacturer, Serial Number}, and the records observed by three different agents:

REC1={Model1, Man1, SN1},{SB1}
REC2={?, ?, SN1},{MAC1}
REC3={SB1},{MAC1}

In this scenario there is a partial matching between records REC1 and REC2 because SN1 is a common value for the attributes of the composite key {Model, Manufacturer, Serial Number}. As REC3 have overlapping attributes from REC1 and REC2, it can be inferred that REC1, REC2 and REC3 refer to the same computer:

RECONCILED RESOURCE={Model1, Man1, SN1}, {SB1},{MAC1}

Now, suppose that a new record REC4 is collected as follows:

REC4={?, Man2, SN2},{MAC1}

In this case, there is no full or partial matching in the composite key {Model, Manufacturer, Serial Number}. Therefore, REC4 refers to a new entity, and unified view of the current is as follows:

RECONCILED RESOURCE={E1, E2}, where
E1={?, Man2, SN2},{MAC1}
E2={Model1, Man1, SN1},{SB1}

External attributes have the advantage over regular attributes, especially, if they are collected in real time and can provide a more updated and accurate view of the current state of the entities. Suppose the following set of regular attributes, and additional external attributes system temperature and number of processors:

REC1={Model1, Man1, SN1},{SB1}, {Temp=27 C, CPUNum=2}
REC2={?, ?, SN1},{MAC1}, {Temp=27 C, CPUNum=2}
REC3={?, ?, SN1},{MAC2}, {Temp=29 C, CPUNum=4}

In this case there is a partial matching between REC1, REC2 and REC3 for the composite key {Model, Manufacturer, Serial Number}. However, from the external attributes in this attribute, this embodiment of the present invention can infer that REC1 and REC3 do not refer to the same entity.

In step 240, inventory reconciliation program 180 updates inventory repository 160 with new information from the executed external factors model to reconcile inventory repository 160 records. For one embodiment, updating inventory repository 160 involves communication with inventory repository 160 in a similar fashion, as formerly described, in step 220.

In step 250, inventory reconciliation program 180 unlocks inventory repository 160 to allow other computers on network 110, such as the agent computers 120a, 120b, and 120c access to inventory repository 160.

Figure 3:
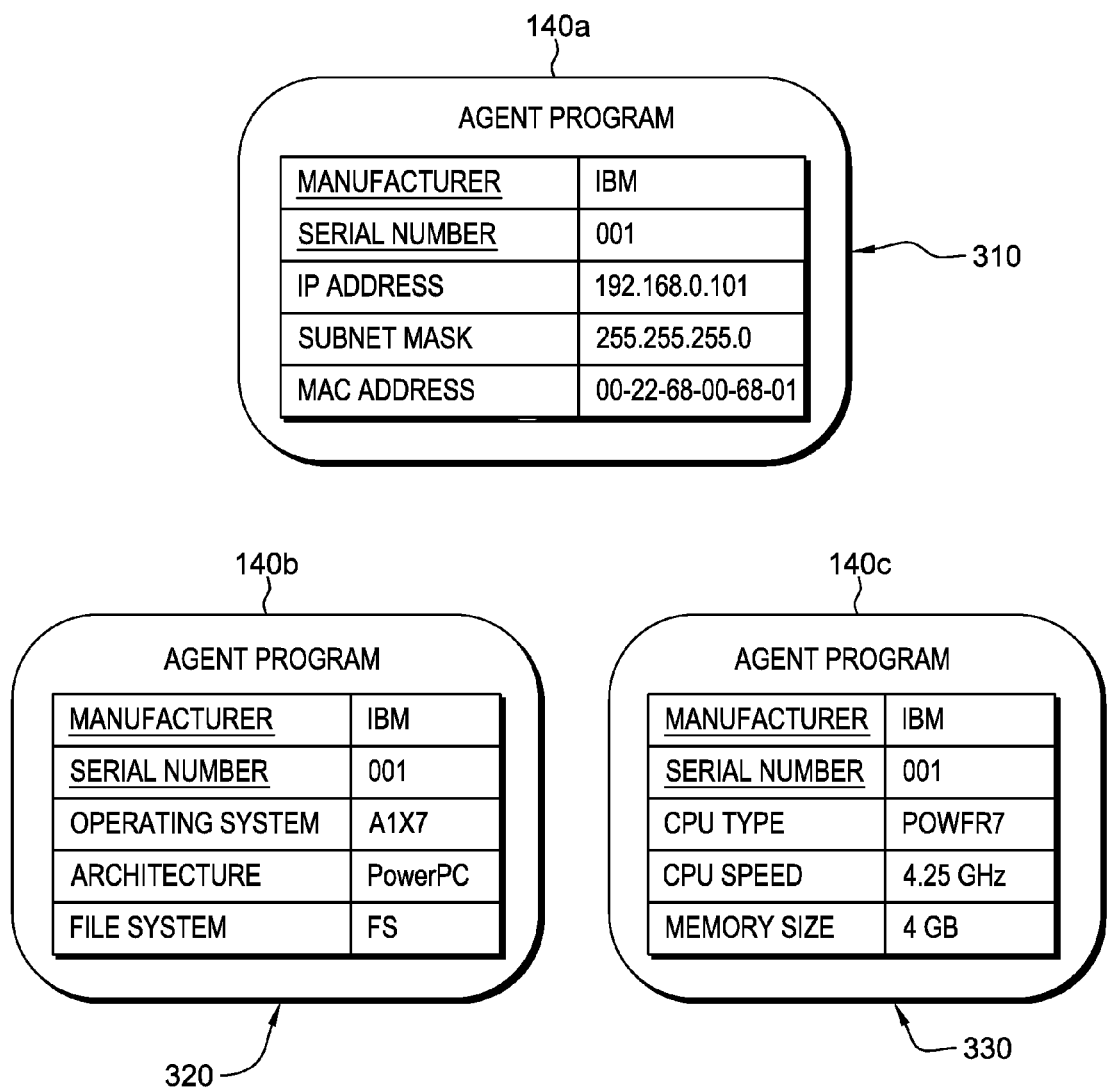
FIG. 3 shows a detailed view of the agent portions of the environment of FIG. 1.

FIG. 3 shows records respectively captured by three agent programs, 140a, 140b, and 140c. In this example, three agents separately discover computers with manufacturer IBM® and serial number 001. Exemplary record 310 is discovered by agent program 140a. Exemplary record 320 is discovered by agent program 140b. Exemplary record 330 is discovered by agent program 140c. The agent programs discover different subsets of non-key attributes. Agent program 140a discovers internet protocol (IP) address, subnet mask and media access control (MAC) address. Agent program 140b discovers operating system advanced interactive executive (AIX) 7, architecture performance optimization with enhanced reduced instruction set computer (hereafter simply called, "PowerPC") and file system type journaled file system (JFS). Agent program 140c discovers hardware related information like the central processing unit (CPU) type Power7, CPU speed 4.25 gigahertz (GHz), memory size 4 gigabytes (4 GB). Manufacturer and serial number are not enough to state that the three different computers discovered by each one of the applications are in fact the same computer, as these two properties do not uniquely identify a computer. To do so, this embodiment of the present invention would need to know the model of the computer, completing the composite key {Manufacturer, Model, Serial Number}.

As mentioned and defined above, external factors are different from regular attributes of an entity, in that they are obtained from other entities that may not be directly related to the observed entity, or they are not in the set of attributes that are normally observed in an entity. External factors can be obtained in real time, while normal attributes are static, in the sense they are just a snapshot from an entity state obtained during regular or event triggered discovering. Regarding a computer, examples of external factors are temperature and electricity. An attribute of an entity may be considered a regular attribute by an agent, while being considered an external factor by another agent. For example, in the example above, the subnet mask is an external factor for agents agent program 140b and agent program 140c because subnet mask is not one the attributes directly observed by them. Number of processors and machine state (up/down) are external factors for agent program 140a, agent program 140b, and agent program 140c, because none of them normally observe these attributes.

External attributes can be obtained by using protocols and interfaces for remote computer management. One of these interfaces is the Intelligent Platform Management Interface (IPMI), which is a standardized computer system interface used by system administrators to manage a computer system and monitor its operation. Parameters such as temperature, cooling fan speeds, power status are obtained by sensors that report this information to an IPMI controller.

A further discussion of splitting a reconciled resource will now be discussed. Suppose a set S of N distinct records that are reconciled due to a record R. While R is valid, there exists 100% certainty that these records refer to the same entity. In current reconciliation systems, if record R is removed or invalidated, and there is no other record that correlates the disjoint key attributes of the remaining records, the certainty that these records still belong to the same Reconciled Resource immediately drops to 0%. This embodiment of the present invention is able to gradually drop the confidence that the remaining records still belong to the same Reconciled Resource, based on non-key and external attributes of the records associated with it.

At this juncture, this embodiment of the present invention is only interested in splitting the Reconciled Resource, and not reconciling other records to it, thus the matching probability of the Records involved are not included. Therefore, the formula for the calculus of the matching probability of two records R and S is reduced to the following, where $A_{ri}$ is the i-th non-key attribute of R and where $A_{si}$ is the i-th non-key attribute of S: MatchingProb(R,S)=product(MatchingProb($K_{ri}$, $K_{si}$))·product(prob($A_{ri}$,$A_{si}$))

Where MatchingProb($K_{ri}$, $K_{si}$) is defined as 0 (zero) only if $K_{ri}$ !=$K_{si}$. It means that this embodiment of the present invention only considers the matching probability as 0 if there is at least one pair of (composite) keys that is incompatible between the two records.

The method for splitting a Reconciled Resource follows:

First, remove record R and update the Reconciled Resource based on the information of the remaining records. The update itself is implementation dependent. It may be based on modification time of the records, or any other factor, such as predefined providers priority.

Second, for each record $r_i$ in S that does not have at least one key in common with the Reconciled Resource, calculate $M_i$ as MatchingProb($r_i$, S).

Third, split (disassociated from the Reconciled Resource) all records that have MatchingProb below a predefined threshold. Note that records that have conflicting key attributes will have a value of 0 and will also be split.

Fourth, for the remaining records, associate the pair($r_i$, $M_i$) to the updated Reconciled Resource. Records that do not have at least one key in common with the Reconciled Resource will be marked with a flag indicating that they are weakly associated.

Fifth, let the Overall Reliability (ORL) of the Reconciled Resource be Product(Mi).

Certain types of users may be interested in Reconciled Resources that have 100% certainty (for example a system that applies patches in operating systems), while others may agree with a smaller certainty (for example reporting tools).

A user is able to issue a query to the reconciliation system specifying the degree of certainty it may accept (ORL). It is also possible to restrict the registration records that should be used to construct the Reconciled Resources returned in the result of the query. In this case, the reconciliation system must discard the registration records with certainty below the one specified by the user, that reconstruct the Reconciled Resources on the fly (during query time) with only the acceptable records.

At some point, due to new discoveries, the weakly associated records that remained associated to a Reconciled Resource may be split. This may happen when a new record that contains joint key attributes is defined, or when a weakly associated record is updated and its MatchingProb becomes lower than the acceptable threshold.

FIG. 4 depicts a block diagram of components of agent computer 120a, agent computer 120b, agent computer 120c, server computer 150, and reconciliation computer 170, in accordance with one embodiment of the present invention. It should be appreciated that FIG. 4 provides only an illustration of one implementation and does not imply any limitations with regard to the environments in which different embodiments may be implemented. Many modifications to the depicted environment may be made.

Agent computer 120a, agent computer 120b, agent computer 120c, server computer 150, and reconciliation computer 170, each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Inventory reconciliation program 180 is stored in persistent storage 408 of reconciliation computer 170 for execution by one or more of the respective computer processors 404 via one or more memories of memory 406. Inventory repository 160 is stored in persistent storage 408 of server computer 170 for execution by one or more of the respective computer processors 404 via one or more memories of memory 406. Agent program 140a is stored in persistent storage 408 of agent computer 120a for execution by one or more of the respective computer processors 404 via one or more memories of memory 406. Agent program 140b is stored in persistent storage 408 of agent computer 120b for execution by one or more of the respective computer processors 404 via one or more memories of memory 406. Agent program 140c is stored in persistent storage 408 of agent computer 120c for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of enterprise grid (not shown) and distributed data processing environment computers. In these examples, communications unit 410 includes one or more network interface cards. Communications unit 410 may provide communications through the use of either or both physical and wireless communications links. Inventory reconciliation program 180 may be downloaded to persistent storage 408 through communications unit 410 of reconciliation computer 170. Inventory repository 160 may be downloaded to persistent storage 408 of server computer 150 through communications unit 410 of server computer 150. Agent program 140a may be downloaded to persistent storage 408 through communications unit 410 of agent computer 120a. Agent program 140b may be downloaded to persistent storage 408 through communications unit 410 of agent computer 120b. Agent program 140c may be downloaded to persistent storage 408 through communications unit 410 of agent computer 120c.

I/O interface(s) 412 allows for input and output of data with other devices that may be connected to distributed data processing environment computers. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, (e.g., inventory reconciliation program 180, inventory repository 160, agent program 140a, agent program 140b, and agent program 140c), can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
    receiving a first record from a first source that relates to a first subject entity, wherein the first subject entity is subject to inventory management;
    receiving a second record from a second source that relates to a second subject entity where it is unknown whether the first subject entity is the same as the second subject entity, wherein the second subject entity is subject to inventory management, and wherein the second record is different than the first record, wherein the second source is different than the first source;
    comparing a first external/non-key attribute value for the first subject entity to a second external/non-key attribute value for the second subject entity, wherein the first external/non-key attribute value and the second external/non-key attribute value include disk speed, memory usage, and number of processors;
    determining a probability value corresponding to the probability that the first subject entity and the second subject entity are the same based, at least in part, upon the comparison of the first external/non-key attribute value to the second external/non-key attribute value;
    in response to the probability being above a predetermined threshold, merging the first record relating to the first entity and the second record relating to the second entity, wherein the merged records relate to a reconciled entity; and
    generating a reconciled record, wherein the reconciled record relates to a record selected from the first entity, the second entity, and the reconciled entity.

2. The method of claim 1, wherein:
    the first external/non-key attribute value is a value for an external type attribute having one of the following sub-types: (i) obtained from other entities that may not be directly related to the first subject entity, or (i) not normally observed in entities similar to the first subject entity.

3. The method of claim 2, further comprising:
    obtaining the first external/non-key attribute value in real time.

4. The method of claim 1, wherein:
    the first external/non-key attribute value is a value for a non-key type attribute; and
    the first external/non-key attribute value is included in the first record.

5. The method of claim 1, further comprising:
    determining that the first subject entity and the second subject entity are not the same based, at least in part, on the probability value.

6. The method of claim 1, further comprising:
    determining that the first subject entity and the second subject entity are the same based, at least in part, on the probability value.

7. A computer program product comprising:
    one or more computer-readable storage media and program instructions stored on the one or more computer readable storage media, the program instructions comprising:
    program instructions to receive a first record from a first source that relates to a first subject entity, wherein the first subject entity is subject to inventory management;
    program instructions to receive a second record from a second source that relates to a second subject entity where it is unknown whether the first subject entity is the same as the second subject entity, wherein the second subject entity is subject to inventory management, and wherein the second record is different than the first record, wherein the second source is different than the first source;
    program instructions to compare a first external/non-key attribute value for the first subject entity to a second external/non-key attribute value for the second subject entity, wherein the first external/non-key attribute value and the second external/non-key attribute value include disk speed, memory usage, and number of processors;
    program instructions to determine a probability value corresponding to the probability that the first subject entity and the second subject entity are the same based, at least in part, upon the comparison of the first external/non-key attribute value to the second external/non-key attribute value;
    program instructions to, in response to the probability being above a predetermined threshold, merge the first record relating to the first entity and the second record relating to the second entity, wherein the merged records relate to a reconciled entity; and
    program instructions to generate a reconciled record, wherein the reconciled record relates to a record selected from the first entity, the second entity, and the reconciled entity.

8. The computer program product of claim 7, wherein:
    the first external/non-key attribute value is a value for an external type attribute having one of the following sub-types: (i) obtained from other entities that may not be directly related to the first subject entity, or (i) not normally observed in entities similar to the first subject entity.

9. The computer program product of claim 8, further comprising:

program instructions, stored on the one or more computer-readable storage media, to obtain the first external/non-key attribute value in real time.

10. The computer program product of claim 7, wherein:
the first external/non-key attribute value is a value for a non-key type attribute; and
the first external/non-key attribute value is included in the first record.

11. The computer program product of claim 7, further comprising:
program instructions, stored on the one or more computer-readable storage media, to determine that the first subject entity and the second subject entity are not the same based, at least in part, on the probability value.

12. The computer program product of claim 7, further comprising:
program instructions, stored on the one or more computer-readable storage media, to determine that the first subject entity and the second subject entity are the same based, at least in part, on the probability value.

13. A computer system comprising:
one or more computer processors, one or more computer-readable storage media, and program instructions stored on the one or more computer readable storage media for execution by at least one of the one or more computer processors, the program instructions comprising:
program instructions to receive a first record from a first source that relates to a first subject entity, wherein the first subject entity is subject to inventory management;
program instructions to receive a second record from a second source that relates to a second subject entity where it is unknown whether the first subject entity is the same as the second subject entity, wherein the second subject entity is subject to inventory management, and wherein the second record is different than the first record, wherein the second source is different than the first source;
program instructions to compare a first external/non-key attribute value for the first subject entity to a second external/non-key attribute value for the second subject entity, wherein the first external/non-key attribute value and the second external/non-key attribute value include disk speed, memory usage, and number of processors;
program instructions to determine a probability value corresponding to the probability that the first subject entity and the second subject entity are the same based, at least in part, upon the comparison of the first external/non-key attribute value to the second external/non-key attribute value;
program instructions to, in response to the probability being above a predetermined threshold, merge the first record relating to the first entity and the second record relating to the second entity, wherein the merged records relate to a reconciled entity; and
program instructions to generate a reconciled record, wherein the reconciled record relates to a record selected from the first entity, the second entity, and the reconciled entity.

14. The computer system of claim 13, wherein:
the first external/non-key attribute value is a value for an external type attribute having one of the following sub-types: (i) obtained from other entities that may not be directly related to the first subject entity, or (i) not normally observed in entities similar to the first subject entity.

15. The computer system of claim 14, further comprising:
program instructions, stored on the one or more computer-readable storage media for execution by at least one of the one or more processors, to obtain the first external/non-key attribute value in real time.

16. The computer system of claim 13, wherein:
the first external/non-key attribute value is a value for a non-key type attribute; and
the first external/non-key attribute value is included in the first record.

17. The computer system of claim 13, further comprising:
program instructions, stored on the one or more computer-readable storage media for execution by at least one of the one or more processors, to determine that the first subject entity and the second subject entity are not the same based, at least in part, on the probability value.

18. The computer system of claim 13, further comprising:
program instructions, stored on the one or more computer-readable storage media for execution by at least one of the one or more processors, to determine that the first subject entity and the second subject entity are the same based, at least in part, on the probability value.

19. The method of claim 1, wherein the first source is a computing device.

20. The method of claim 1, wherein the second source is a computing device.

* * * * *